(12) United States Patent
Ungerbuehler et al.

(10) Patent No.: US 6,325,687 B1
(45) Date of Patent: Dec. 4, 2001

(54) OVERHEAT INDICATOR FOR STRUT BEARING AND STERN TUBE BEARING

(76) Inventors: David Ungerbuehler, 3480 NE. 15th Ave., Ft. Lauderdale, FL (US) 33334; Harvey W. Chaples, P.O. Box 23295, Ft. Lauderdale, FL (US) 33307

( * ) Notice: Subject to any disclaimer, the term of this patent is extended or adjusted under 35 U.S.C. 154(b) by 0 days.

(21) Appl. No.: 09/637,203

(22) Filed: Aug. 14, 2000

(51) Int. Cl.$^7$ .................................................. B63H 5/10
(52) U.S. Cl. .................................................. 440/82; 403/312
(58) Field of Search .................. 440/82, 83; 403/312; 340/682

(56) References Cited

U.S. PATENT DOCUMENTS

| | | |
|---|---|---|
| 3,824,579 | 7/1974 | Waseleski, Jr. ..................... 340/269 |
| 4,074,575 | 2/1978 | Bergman et al. ..................... 73/344 |
| 4,167,734 | 9/1979 | Logan et al. ..................... 340/682 |
| 4,316,175 | 2/1982 | Korber et al. ..................... 340/57 |
| 4,354,183 | 10/1982 | Weeks et al. ..................... 340/682 |
| 5,216,421 | 6/1993 | Sawada et al. ..................... 340/984 |
| 5,433,525 | * 7/1995 | El-Ibiary ..................... 374/141 |
| 5,446,452 | 8/1995 | Litton ..................... 340/870 |
| 5,582,528 | * 12/1996 | Rafferty et al. ..................... 440/82 |
| 5,642,105 | 6/1997 | Duffy et al. ..................... 340/870 |
| 5,952,587 | 9/1999 | Rhodes et al. ..................... 73/862 |
| 6,015,233 | 1/2000 | Hicks ..................... 374/153 |

* cited by examiner

Primary Examiner—Jesus D. Sotelo
(74) Attorney, Agent, or Firm—Oltman, Flynn & Kubler

(57) ABSTRACT

For monitoring the temperature of a water-cooled bearing mounted in a strut on an engine-driven water vessel and supporting the vessel's propellor shaft, a heat sensor on the strut for sensing the bearing temperature, and visual and/or audible indicator means on the vessel operated by the heat sensor to indicate overheating of the bearing.

4 Claims, 1 Drawing Sheet

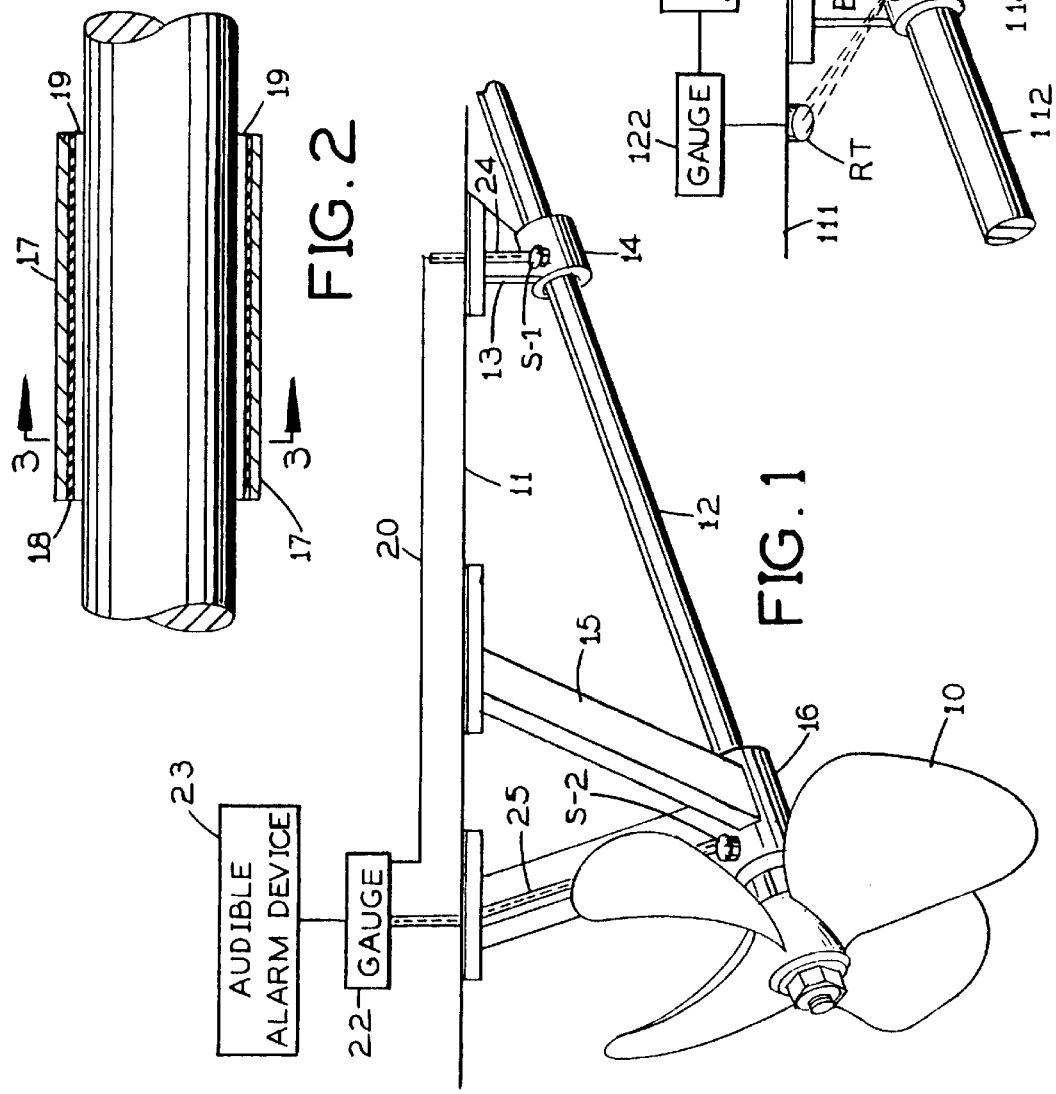

US 6,325,687 B1

OVERHEAT INDICATOR FOR STRUT BEARING AND STERN TUBE BEARING

BACKGROUND OF THE INVENTION

This invention relates to an arrangement for detecting and indicating the overheating of a strut bearing that supports a propellor shaft on a water vessel.

Various arrangements have been proposed heretofore for detecting the overheating of oil-lubricated anti-friction bearings in a diverse types of equipment in which the bearing surfaces normally do not come into contact with water. Examples of such arrangements are disclosed in the following U.S. patents: Waseleski et al U.S. Pat. No. 3,824,579, Bergman et al U.S. Pat. No. 4,074,575, Logan et al U.S. Pat. No. 4,167,734, Korber et al U.S. Pat. No. 4,316,175, Weeks et al U.S. Pat. No. 4,354,183, El-Ibiary U.S. Pat. No. 5,433,525, Litton U.S. Pat. No. 5,446,452, Duffy et al U.S. Pat. No. 5,642,105, Rhodes et al U.S. Pat. No. 5,952,587, and Hicks U.S. Pat. No. 6,015,233.

It is a conventional practice on water vessels to provide one or more struts extending down from the bottom of the vessel and each holding a bearing which rotatably supports the vessel's propellor shaft. Commonly, such bearings are formed with longitudinal water passages next to the propellor shaft to keep the bearing water-cooled by the vessel's movement through the water. Any significant restriction of water flow through the bearing—such as can occur when a line gets wrapped around the propellor shaft, or some other foreign object or substance gets into the bearing—can cause potentially troublesome overheating of the bearing.

SUMMARY OF THE INVENTION

The present invention is directed to a novel arrangement of a heat sensor on such a marine bearing and a suitable visual and/or audible indicator on the vessel operatively coupled to the heat sensor to produce a warning in case the bearing overheats while the vessel is under way.

BRIEF DESCRIPTION OF THE DRAWINGS

Figure is a schematic side elevation showing a propellor shaft of a water vessel with a first embodiment of the present invention monitoring its bearings;

FIG. 2 is a longitudinal section through one of these bearings;

FIG. 3 is a cross-section through this bearing; and

FIG. 4 is a partial schematic side elevation similar to FIG. 1 and showing a second embodiment of the present invention monitoring one of the propellor shaft bearings.

DETAILED DESCRIPTION OF THE INVENTION

Before explaining the present invention in detail it is to be understood that the invention is not limited in its application to the particular arrangements shown and described since the invention is capable of other embodiments. Also, the terminology used herein is for the purpose of description and not of limitation.

Referring to FIG. 1, the propellor 10 of a water vessel 11 is attached to the free end of a rotary propellor shaft 12 driven by an engine (not shown) on the vessel. A forward strut 13 is bolted at the top to the underside of the vessel and on its lower end presents a cylindrical barrel or stern tube 14 which holds an anti-friction marine bearing of known design for rotatably supporting the propellor shaft near where it is coupled to the engine. A rear strut 15 of generally V-shaped configuration has its upper end bolted to the vessel toward the propellor and on its lower end presents a cylindrical barrel or stern tube 16 holding another anti-friction marine bearing of known design which rotatably supports the propellor shaft 12 a short distance from the propellor.

FIGS. 2 and 3 show in detail one of these bearings carried by the struts. Each of these bearings is of known design and meets U.S. Navy specifications. The bearing comprises a cylindrical outer shell 17, which may be of naval brass or of fiberglass and epoxy resin, and a tubular inner sleeve 18 of oil-resistant soft rubber glued to the inside of the outer shell 17. The bearing is press fitted hydraulically into the barrel 14 or 16 of the corresponding strut 13 or 15 and is secured to its by set screws (not shown).

The rubber inner sleeve 18 of the bearing is fluted on the inside, presenting a series of circumferentially spaced longitudinal grooves or channels 19 which extend the entire length of the bearing and are open at the opposite ends of the strut barrel 14 or 16. These grooves or channels provide water passages next to the surface of the propellor shaft, and when the vessel is under way its movement through the water draws water through these passages to lubricate and cool the bearing and the propellor shaft at their bearing surfaces.

In accordance with the present invention, a heat sensor of known design is mounted on each bearing to detect overheating of the bearing. In the particular two strut arrangement shown in FIG. 1, a pyroelectric transducer S-1 is the heat sensor for the bearing held by the forward strut 13, and a similar transducer S-2 is the heat sensor on the bearing held by the rear strut 15. In each the transducer is secured in a drilled and tapped opening in the side wall of the barrel of the corresponding strut. These transducers are electrically connected by respective wiring 20 and 21 to a visual gauge 22 of known design and, preferably, also to an audible alarm device 23 of known design, such as a bell, horn or siren that can be heard by the crew of the vessel over the engine noise. In addition, the indicator arrangement may include a light that goes on in response to bearing overheating to get the attention of persons on the vessel. From each heat sensor to the hull of the vessel, the wiring is enclosed in water-tight fashion by a corresponding stainless steel tube or sleeve 24 or 25. Each temperature sensor may be a thermistor, for example, or a thermocouple or a temperature-sensitive crystal.

FIG. 4 shows a second embodiment of this invention in which the temperature responsive signal from a strut-supported anti-friction bearing for the propellor shaft is transmitted in wireless fashion through the water to the hull of the vessel on which the visual and/or audible indicator arrangement is located. Elements shown In FIG. 4 which correspond to elements shown in FIG. 1 are given the same reference numerals, plus 100.

As shown schematically in FIG. 4, a pyroelectric heat sensor S-101 on the barrel 114 of the propellor shaft bearing held by the forward strut 103 is connected electrically by suitable water-tight, insulated wiring W to an electroacoustic broadcast transducer BT positioned nearby, preferably also on barrel 114. In response to the temperature of this bearing, the heat sensor S-101 sends an electrical signal via wiring W to the broadcast transducer BT, which converts this electrical signal into an acoustic signal in the form of a pressure wave that is transmitted through the water to an electroacoustic receiving transducer RT on the hull 111 of the vessel. Transducer RT converts this acoustic signal into a corresponding electrical signal which passes through suitable wiring on the vessel to the visual gauge 122 and/or the visual alarm device 123.

It is to be understood, of course, that the acoustic coupling arrangement shown in FIG. 4 for the forward propellor shaft bearing could be used as well on the rear bearing, or that a single two strut installation may combine both a wired arrangement as shown in FIG. 1 (at one strut) and an acoustic arrangement as shown in FIG. 4 (on the other strut)

Also, it is to be understood that either embodiment of this invention can be applied to a vessel having just one strut bearing for the propellor shaft.

From the foregoing, it will be apparent that the present invention satisfies a need for monitoring the temperature of a propellor shaft bearing to detect abnormalities which might otherwise go unnoticed by the operator and crew of a boat because of the virtual impossibility of noticing them while the boat is under way.

We claim:

1. On a propeller-driven water vessel having a strut with a barrel on its lower end for passing the propeller shaft of the vessel, the combination of: a bearing secured in said barrel of the strut rotatable supporting said propeller shaft, said bearing having open-ended longitudinal passages therein which are open to said propeller shaft for passing water as the vessel moves through the water, a heat sensor on said strut barrel for sensing the temperature of said bearing; and signalling means on the vessel responsive to said sensor for indicating overheating of the bearing, wherein said sensor is a pyroelectric sensor the producing an electrical signal responsive to the temperature of said bearing.

2. The combination according to claim 1, and further comprising electrical wiring connecting said sensor to said signalling means on the vessel.

3. The combination according to claim 1, and further comprising electroacoustic transducer means coupling said sensor to said signalling means on the vessel.

4. The combination of: a propeller strut for attachment to a water vessel/and annular bearing carried by said strut for rotatably supporting the propeller shaft of the vessel, said bearing having open-ended longitudinal water passages on the inside; and a heat sensor on said strut operatively arranged to sense the temperature of said bearing, wherein said sensor is a pyroelectric device.

* * * * *